(12) United States Patent
Rácz et al.

(10) Patent No.: US 8,792,408 B2
(45) Date of Patent: Jul. 29, 2014

(54) BACKHAUL HEADER COMPRESSION

(75) Inventors: András Rácz, Budapest (HU); Zoltán Richárd Turányi, Szentendre (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 346 days.

(21) Appl. No.: 12/629,217

(22) Filed: Dec. 2, 2009

(65) Prior Publication Data

US 2010/0322151 A1  Dec. 23, 2010

Related U.S. Application Data

(60) Provisional application No. 61/218,107, filed on Jun. 18, 2009.

(51) Int. Cl.
*H04J 1/10* (2006.01)
(52) U.S. Cl.
USPC ........... 370/315; 370/389; 370/474; 370/477; 709/247
(58) Field of Classification Search
None
See application file for complete search history.

(56) References Cited

U.S. PATENT DOCUMENTS

2006/0268820 A1* 11/2006 Mahkonen et al. ........... 370/349
2009/0016334 A1*  1/2009 Forsberg et al. .............. 370/389

(Continued)

FOREIGN PATENT DOCUMENTS

| EP | 1 973 274 A2 | 9/2008 |
|---|---|---|
| WO | WO 2009/007109 A2 | 1/2009 |
| WO | WO 2009/134178 A1 | 5/2009 |

OTHER PUBLICATIONS

3GPP TS 36.410, 3rd Generation Partnership Project; Technical Specification Group Radio Access Network; Evolved Universal Terrestrial Access Network (E-UTRAN); S1 General Aspects and Principles, (Release 8), V8.2.0, (Mar. 2009).

(Continued)

*Primary Examiner* — Khoa Huynh
(74) *Attorney, Agent, or Firm* — Nixon & Vanderhye, P.C.

(57) ABSTRACT

A telecommunications network, and particularly a mobility management entity (MME) (26) of the telecommunications network, performs negotiation of use of header compression over at least a portion of a backhaul link extending between a base station node (28) and a serving gateway (SGW) (24). In some embodiments the backhaul link comprises a radio link. In certain bearer encapsulation embodiments having radio-interface borne backhaul links a General Packet Radio service Tunneling Protocol (GTP) tunnel traverses between the serving gateway node and a relay base station node. In such bearer encapsulation embodiments the method further comprises handling signaling between the serving gateway node and the relay base station node for negotiating the use of the header compression inside the General Packet Radio service Tunneling Protocol (GTP) tunnel. In certain proxy embodiments having radio-interface borne backhaul links the backhaul link comprises a first tunnel extending between the serving gateway node and a donor base station node and a further (e.g., second) tunnel extending between the donor base station node and the relay base station node. In such example proxy embodiments the method further comprises handling signaling between the relay base station node and the donor base station node for negotiating the use of the header compression inside the second tunnel, and (optionally) handling signaling between the donor base station node and the serving gateway node for negotiating the use of the header compression inside the first tunnel.

22 Claims, 15 Drawing Sheets

(56) References Cited

U.S. PATENT DOCUMENTS

2009/0080374 A1* 3/2009 Lee et al. .................. 370/328
2010/0260098 A1* 10/2010 Ulupinar et al. ............ 370/315

OTHER PUBLICATIONS

International Preliminary Report on Patentability and Written Opinion dated Dec. 12, 2011.

3GPP TS 23.401, $3^{rd}$ Generation Partnership Project; Technical Specification Group Services and System Aspects; General Packet Radio Service (GPRS) Enhancements for Evolved Universal Terrestrial Radio Access Network (E-UTRAN) Access, (Release 9), V9.2.0 (Sep. 2009).
3GPP TSG-RAN WG2 #67, on compression protocol for Un, Shenzhen, China, Aug. 24-28, 2009.
Indonesian Office Action mailed Dec. 13, 2014 in Indonesian Patent Application HK-3-HI.05.02.04 7160.

* cited by examiner

BACKHAUL HEADER COMPRESSION

BACKGROUND

This application claims the priority and benefit of U.S. provisional patent application 61/218,107 filed Jun. 18, 2009, entitled "MME COORDINATED BACKHAUL HEADER COMPRESSION", which is incorporated herein by reference in its entirety. This application is related to PCT/SE2008/051004 (WO/2009/134178), entitled "SELF-BACKHAULING IN LTE", which is incorporated herein by reference.

This invention pertains to telecommunications, and particularly to header compression.

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks is also called a "NodeB". A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN is essentially a radio access network using wideband code division multiple access for user equipment units (UEs).

In a forum known as the Third Generation Partnership Project (3GPP), telecommunications suppliers propose and agree upon standards for third generation networks and UTRAN specifically, and investigate enhanced data rate and radio capacity. The Third Generation Partnership Project (3GPP) has undertaken to evolve further the UTRAN and GSM based radio access network technologies. Specifications for the Evolved Universal Terrestrial Radio Access Network (E-UTRAN) are ongoing within the 3$^{rd}$ Generation Partnership Project (3GPP). The Evolved Universal Terrestrial Radio Access Network (E-UTRAN) comprises the Long Term Evolution (LTE) and System Architecture Evolution (SAE).

Long Term Evolution (LTE) is a variant of a 3GPP radio access technology wherein the radio base station nodes are connected directly to a core network rather than to radio network controller (RNC) nodes. In general, in LTE the functions of a radio network controller (RNC) node are performed by the radio base stations nodes. As such, the radio access network (RAN) of an LTE system has an essentially "flat" architecture comprising radio base station nodes without reporting to radio network controller (RNC) nodes.

The evolved UTRAN (E-UTRAN) comprises evolved base station nodes, e.g., evolved NodeBs or eNodeBs or eNBs, providing evolved UTRA user-plane and control-plane protocol terminations toward the user equipment unit (UE). The eNB hosts the following functions (among other functions not listed): (1) functions for radio resource management (e.g., radio bearer control, radio admission control), connection mobility control, dynamic resource allocation (scheduling); (2) selection of a mobility management entity (MME) when no routing to an MME can be determined from the information provided by the user equipment unit (UE); and (3) User Plane functions, including IP Header Compression and encryption of user data streams; and switching of U-plane for support of UE mobility. The eNB hosts the PHYsical (PHY), Medium Access Control (MAC), Radio Link Control (RLC), and Packet Data Control Protocol (PDCP) layers that include the functionality of user-plane header-compression and encryption. The eNodeB also offers Radio Resource Control (RRC) functionality corresponding to the control plane. The eNodeB performs many functions including radio resource management, admission control, scheduling, enforcement of negotiated UL QoS, cell information broadcast, ciphering/deciphering of user and control plane data, and compression/decompression of DL/UL user plane packet headers.

The aforementioned mobility management entity (MME) is the main signaling node/entity in the Evolved Packet Core (EPC). The mobility management entity is responsible for initiating paging and authentication of the wireless terminal (UE). The mobility management entity also keeps location information at the Tracking Area level for idle mode UEs and is involved in choosing the right gateway during the initial registration process. The MME connects to eNBs through the S1-MME interface and connects to a serving gateway (SGW) through the S11 interface. Multiple MMEs can be grouped together in a pool to meet increasing signaling load in the network. The MME also plays an important part in handover signaling between LTE and 2G/3G networks.

The Evolved Packet Core is the IP-based core network defined by 3GPP in release 8 for use by LTE and other access technologies. The EPC typically includes a Mobility Management Entity, a Serving Gateway and PDN Gateway sub-components. The EPC provides a simplified, all-IP core network architecture to give access to various services such as the ones provided in IMS (IP Multimedia Subsystem).

GPRS Tunnelling Protocol (GTP) is a group of IP-based communications protocols used to establish and manage communication sessions and carry encapsulated user data packets in General Packet Radio Service (GPRS) within GSM and UMTS networks, as well as in SAE/LTE networks.

In WCDMA networks, user plane ciphering and header compression (HC) is performed in the radio network controller node (RNC). This means that the traffic between the NodeBs and the RNC is effectively header compressed, leading to reduced traffic over the expensive RAN backhaul (transport between NodeB and RNC). However, in LTE the header compression is performed in the eNodeB. This means that upstream backhaul links (extending between the eNodeB and the evolved core network) carry user IP packets without header compression. Transporting IP packets on the upstream backhaul link without header compression presents significant overhead. For example, with an average packet size of 500 bytes, a compressed TCP/IP header removes 40 bytes of the packet, resulting in 8% of traffic reduction at no loss of functions. If typical packet sizes are smaller, the gain can be higher.

SUMMARY

In one of its aspects the technology disclosed herein concerns a method in a mobility management entity of a telecommunications network comprising negotiating use of header compression over at least a portion of a backhaul link. In another of its aspects the technology disclosed herein concerns a method of operating a telecommunications network comprising negotiating use of header compression over at least a portion of a backhaul link. As used herein, the backhaul link extends between a serving gateway node and a base station node of the telecommunications network.

The backhaul link generally comprises a General Packet Radio service Tunneling Protocol (GTP) tunnel between the serving gateway node and a base station node and the header compression is applied for packets carried inside the GTP tunnel.

The negotiating of the use of the header compression on the backhaul link can occur upon performance of any one of: (1) a bearer establishment procedure; (2) an attachment procedure; or (3) a handover procedure.

In an example mode and embodiment negotiating the use of header compression comprises: (1) ascertaining whether the serving gateway node agrees to the use of the header compression; (2) ascertaining whether the base station node agrees to the use of the header compression; and (3) using the ascertainments of (1) and (2) to determine whether to implement the header compression on the backhaul link.

In another example mode and embodiment negotiating the use of header compression further comprises: (1) obtaining a header compression initialization parameter from the serving gateway node; (2) obtaining a response from the base station node concerning the header compression initialization parameter; and (3) using the response of act (2) to determine whether to implement the header compression on the backhaul link.

In some example modes and embodiments the backhaul link comprises a radio link. In certain bearer encapsulation embodiments having radio-interface borne backhaul links a General Packet Radio service Tunneling Protocol (GTP) tunnel traverses between the serving gateway node and a relay base station node. In such bearer encapsulation embodiments the method further comprises handling signaling between the serving gateway node and the relay base station node for negotiating the use of the header compression inside the General Packet Radio service Tunneling Protocol (GTP) tunnel.

In certain proxy embodiments having radio-interface borne backhaul links the backhaul link comprises a first tunnel extending between the serving gateway node and a donor base station node and a further (e.g., second) tunnel extending between the donor base station node and the relay base station node. The second tunnel traverses a radio interface between the relay base station node and the donor base station node. In such example proxy embodiments the method further comprises handling signaling between the relay base station node and the donor base station node for negotiating the use of the header compression inside the second tunnel, and (optionally) handling signaling between the donor base station node and the serving gateway node for negotiating the use of the header compression inside the first tunnel.

Another example mode and embodiment further comprises activating the use of the header compression when the backhaul link comprises a transport link having a transport capacity below a predetermined value.

In another of its aspects the technology disclosed herein concerns a method in a base station node of a telecommunications network. The method comprises determining whether there is agreement for use of header compression over at least a portion of a backhaul link, and transmitting a message which is indicative of the agreement.

An example mode and embodiment of the method in the base station node further comprises providing in the message a response to an offer of a header compression initialization parameter offered by the serving gateway node.

In an example mode and embodiment of the method in the base station node the base station node is a relay base station node and the backhaul link comprises a General Packet Radio service Tunneling Protocol (GTP) tunnel extending between the serving gateway node and the relay base station node. The General Packet Radio service Tunneling Protocol (GTP) tunnel traverses a radio interface between the relay base station node and a donor base station node. The method in the base station node further comprises compressing a UDP/IP header of packets carrying the General Packet Radio service Tunneling Protocol (GTP) tunnel from the relay base station node to the donor base station node; and compressing a TCP/UDP/IP inner header of packets traversing the General Packet Radio service Tunneling Protocol (GTP) tunnel from the serving gateway node to the donor base station node.

In another of its aspects the technology disclosed herein concerns a mobility management entity (MME) configured to negotiate whether to use header compression on a backhaul link between a base station node and a serving gateway (SGW).

In another of its aspects the technology disclosed herein concerns a telecommunication network comprising a base station node; a serving gateway (SGW); and a mobility management entity (MME) configured to negotiate whether to use header compression on a backhaul link between a base station node and a serving gateway (SGW).

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

Figure 1:
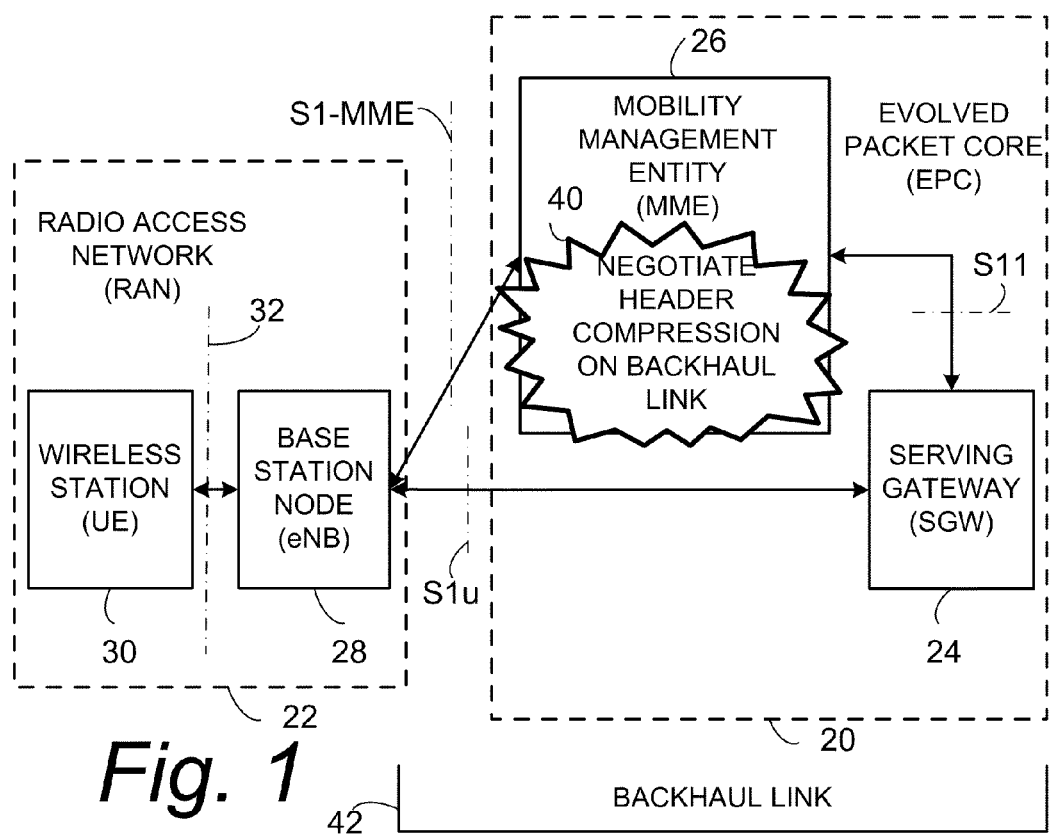
FIG. 1 is schematic view of portions of a telecommunications network showing negotiation of header compression on a backhaul link.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "computer", "processor" or "controller" may be provided through the use of dedicated hardware as well as hardware capable of executing software in the form of coded instructions stored on computer readable medium. A computer is generally understood to comprise one or more processors, and the terms computer and processor may be employed interchangeably herein. When provided by a computer or processor, the functions may be provided by a single dedicated computer or processor, by a single shared computer or processor, or by a plurality of individual computers or processors, some of which may be shared or distributed. Such functions are to be understood as being computer-implemented and thus machine-implemented. Moreover, use of the term "processor" or "controller" shall also be construed to refer to other hardware capable of performing such functions and/or executing software, and may include, without limitation, digital signal processor (DSP) hardware, reduced instruction set processor, hardware (e.g., digital or analog) circuitry, and (where appropriate) state machines capable of performing such functions.

As understood from the preceding discussion, for Long Term Evolution (LTE) it would be beneficial to introduce header compression for traffic between the eNodeB and serving gateway node of the evolved packet core (EPC). The traffic on the upstream backhaul link between the eNodeB and the Serving Gateway (SGW) nodes goes inside a General Packet Radio service Tunneling Protocol (GTP) tunnel. When an IP packet is tunneled inside a GTP tunnel the IP header (called the "inner header") of the original packet is "hidden" inside the tunnel. The tunnel itself has its own IP header, called an "outer header". Only this outer header is visible for the network nodes which the tunnel passes through. Thus, the fact that the traffic travels through the GTP tunnel is a problem for header compression because header compression applied for the tunneled packets is not able to "look" inside the tunnel and to compress the inner headers.

Figure 13:
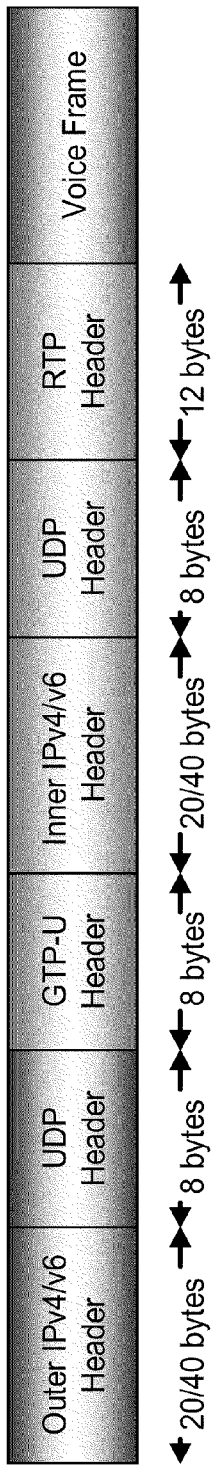
FIG. 13 is a diagrammatic view showing a chain of headers and illustrating GTP tunneling.
Figure 14:
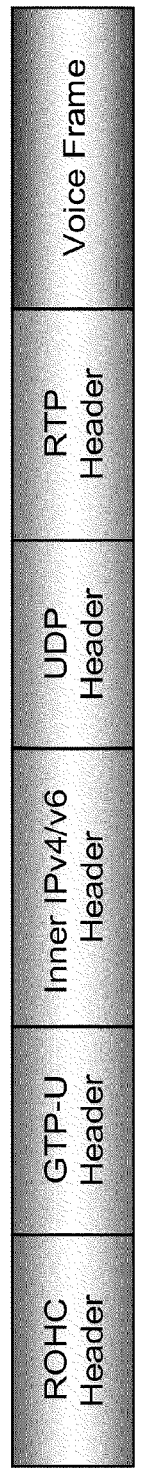
FIG. 14 is a diagrammatic view illustrating compression of only Outer IP and UDP headers with current ROHC profiles.

Further to the foregoing, FIG. 13 shows a chain of headers and illustrates GTP tunneling. Header compression using the ROHC framework can efficiently compress two levels of IP headers, but there are no existing header compression solutions for compression of IP headers inside a GTP tunnel. More specifically, there exist no header compression algorithm (e.g. ROHC profiles) that supports this chain of headers and there are no means to configure the use of header compression inside a GTP tunnel. With current ROHC profiles, only the Outer IP and UDP headers can be compressed as illustrated by FIG. 14. In other words, header compression is not standardized by the $3^{rd}$ Generation Partnership Project (3GPP) standardization body, and thus serving gateway nodes and eNodeBs have no way of knowing if the received data is header compressed or not.

In response to this need, the inventors propose to manage state exchange between the serving gateway node (SGW) and eNodeB in order to negotiate the use of header compression inside a GTP tunnel. In one example embodiment and mode, an agent such as the Mobility Management Entity (MME) serves as an agent for managing state exchange between the serving gateway node (SGW) and eNodeB in order to negotiate the use of header compression inside a GTP tunnel. In other embodiments the negotiator can be another entity such as the SGW itself, particularly if an appropriate signaling protocol is established between the SGW and the eNodeB.

The negotiated use of header compression inside the GTP tunnel allows header compression-capable and header compression-incapable serving gateway nodes and eNodeBs to securely fall back to non-header compression mode and also allows the MME to make a policy decision on the use of header compression. For example, in a situation in which the MME is the negotiating agent the MME may decide to activate header compression only in case the backhaul link involves a radio link (i.e., in case of relaying, self-backhauling, etc.) or if the connection passes through one or more low capacity transport links.

During bearer establishment or handover, indeed every time a General Packet Radio service Tunneling Protocol (GTP) tunnel is set up between the eNodeB and serving gateway node, the parameters of the tunnel need to be exchanged, specifically the TEID for both ends. Such values are exchanged via the mobility management entity. The technology disclosed herein extends these or comparable signals so that, in addition to the TEID, each endpoint specifies whether it can and wants to do header compression or not.

FIG. 1 shows portions of a telecommunications network comprising evolved packet core (EPC) 20 and radio access network (RAN) 22. The evolved packet core (EPC) 20 in turn comprises serving gateway (SGW) 24 and mobility management entity (MME) 26, as well other unillustrated entities and nodes. The evolved packet core (EPC) 20 connects to radio access network (RAN) 22, which in turn comprises at least one base station node 28 (also known as a eNodeB or eNB). The base station node 28 communicates with wireless terminal 30 over an air or radio interface 32. It should be understood that base station node 28 typically serves plural wireless terminals, only one such wireless terminal being shown, and may even serve plural cells.

As shown in FIG. 1, the mobility management entity (MME) 26 communicates over interface S1-MME with base station node 28; the mobility management entity (MME) 26 communicates over interface S11 with serving gateway (SGW) 24; and the serving gateway (SGW) 24 and base station node 28 communicate over interface S1u. The S1-MME interface is a reference point for the control plane protocol between EUTRAN and MME. The protocol over this reference point is S1-AP and it uses Stream Control Transmission Protocol (SCTP) as the transport protocol. The S1u interface is a reference point between EUTRAN and SGW for the per-bearer user plane tunneling and inter-eNB path switching during handover. The transport protocol over the S1u interface is GPRS Tunneling Protocol-User plane (GTP-U).

In one of its aspects the technology disclosed herein concerns methods of operating the telecommunications network, and in some example embodiments particularly methods of operating the mobility management entity (MME) 26, for negotiating use of header compression over at least a portion of a backhaul link. In this respect, FIG. 1 further shows as negotiation act 40 the mobility management entity (MME) 26 performing a negotiation of use of header compression (HC) over at least a portion of backhaul link 42. As used herein, the backhaul link 42 encompasses signaling links which connect the base station node 28 to the serving gateway (SGW) 24, and thus includes signaling links in or toward the evolved packet core (EPC) 20. That is, the backhaul link 42 essentially extends between the serving gateway node 24 and the base station node 28 of the telecommunications network.

Figure 2:
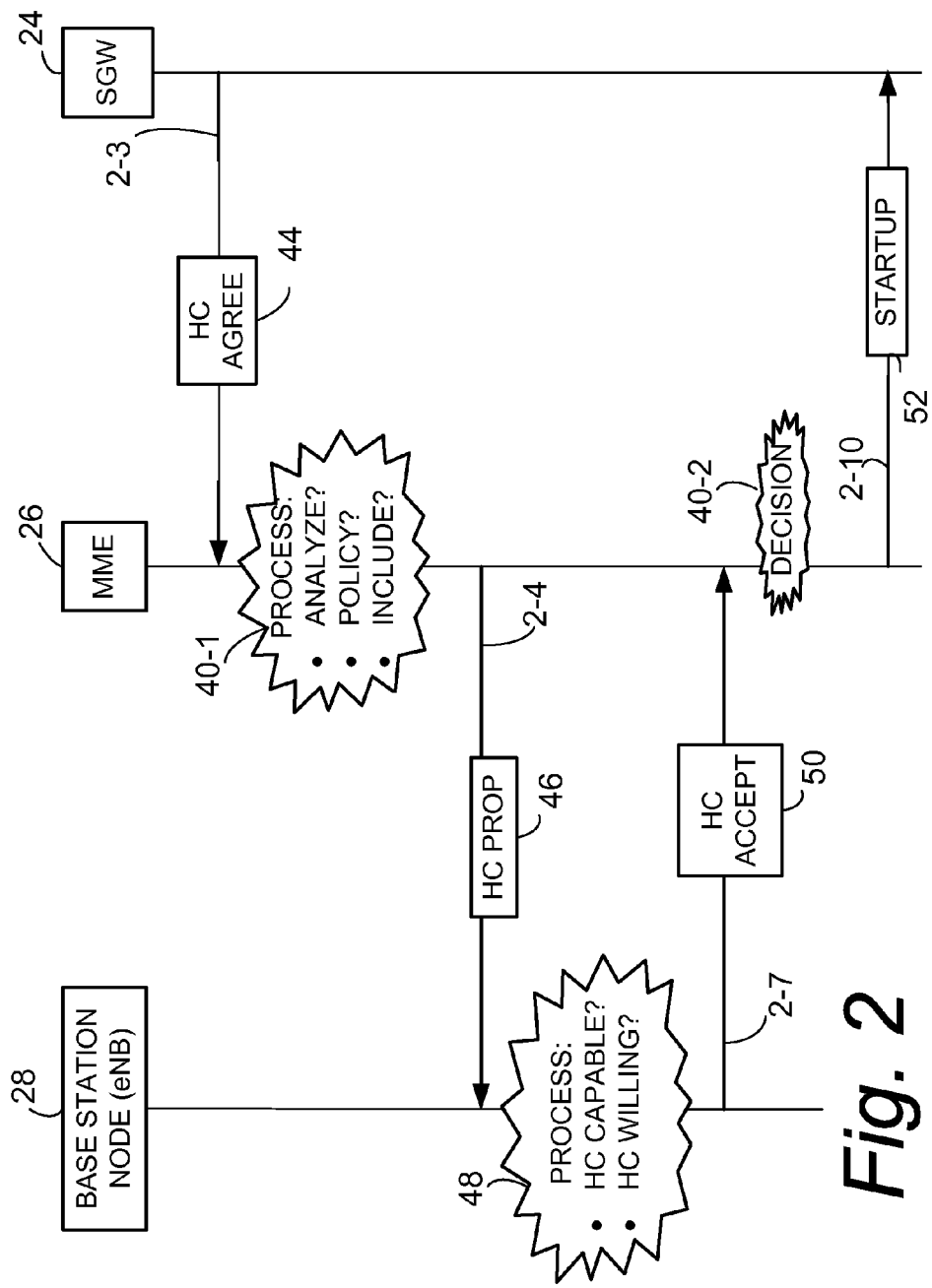
FIG. 2 is a diagrammatic view depicting an example embodiment and mode of signaling in a method of negotiating header compression on a backhaul link.

FIG. 2 depicts example signaling in an example embodiment and mode of performing negotiation act 40 of negotiating header compression on the backhaul link. In FIG. 2, as act 2-3 the serving gateway (SGW) 24 sends a message (the message of act 2-3) which is received by mobility management entity (MME) 26 and which includes in the message a header compression agreement indication 44. The header compression agreement indication 44 signifies that serving gateway (SGW) 24 is able and willing to permit header compression on backhaul link 42. The indication 44 may be, for example, an information element of a new or existing message.

As negotiation processing act 40-1 the mobility management entity (MME) 26 processes the header compression agreement indication 44. In an example implementation, sub-acts of act 40-1 can comprise analyzing the header compression agreement indication 44; determining if the mobility management entity (MME) 26 has any policy concerning serving gateway (SGW) 24; and deciding to include an indication of the header compression agreement indication 44 in a message to be sent to base station node 28. As a result of this last sub-act, act 2-4 of FIG. 2 comprises the mobility management entity (MME) 26 including a header compression proposal 46 in a message (the message of act 2-4) sent from mobility management entity (MME) 26 to base station node 28.

As processing act 48 the base station node 28 processes the header compression proposal 46 delivered in the message of act 2-4. As part of processing act 48, the base station node 28 determines whether base station node 28 is able and willing to engage in header compression over the processing act 42. Upon making such determination, as act 2-7 the base station node 28 returns a header compression acceptance indication 50, which can be an information element of a new or existing message. The header compression acceptance indication 50 of the message of act 2-7 signifies whether or not the base station node 28 agrees to participate in header compression over the backhaul link 42.

As negotiation decision act 40-2 the mobility management entity (MME) 26 processes the header compression acceptance indication 50 in light of its previous receipt of the header compression agreement indication 44 and makes a decision as to whether header compression is to be implemented on backhaul link 42. In accordance with the negotiation decision act 40-2, as act 2-10 the mobility management entity (MME) 26 sends a message (the message of act 2-10) to the serving gateway (SGW) 24. The message of act 2-10 includes a startup indication 52 which signifies that header compression is indeed to be attempted on the backhaul link 42. The startup indication 52 can be an information element of a new or existing message.

Thus, as understood from the scenario of FIG. 2, in an example mode and embodiment the negotiation act 40 (i.e., the act of negotiating the use of header compression) comprises: (1) ascertaining whether the serving gateway node agrees to the use of the header compression (e.g., performing negotiation processing act 40-1 upon receipt of the header compression agreement indication 44); (2) ascertaining whether the base station node agrees to the use of the header compression (e.g., included in negotiation decision act 40-2 as handling the header compression acceptance indication 50); and (3) using the ascertainments of (1) and (2) to determine whether to implement the header compression on the backhaul link (included in negotiation decision act 40-2).

Figure 3:
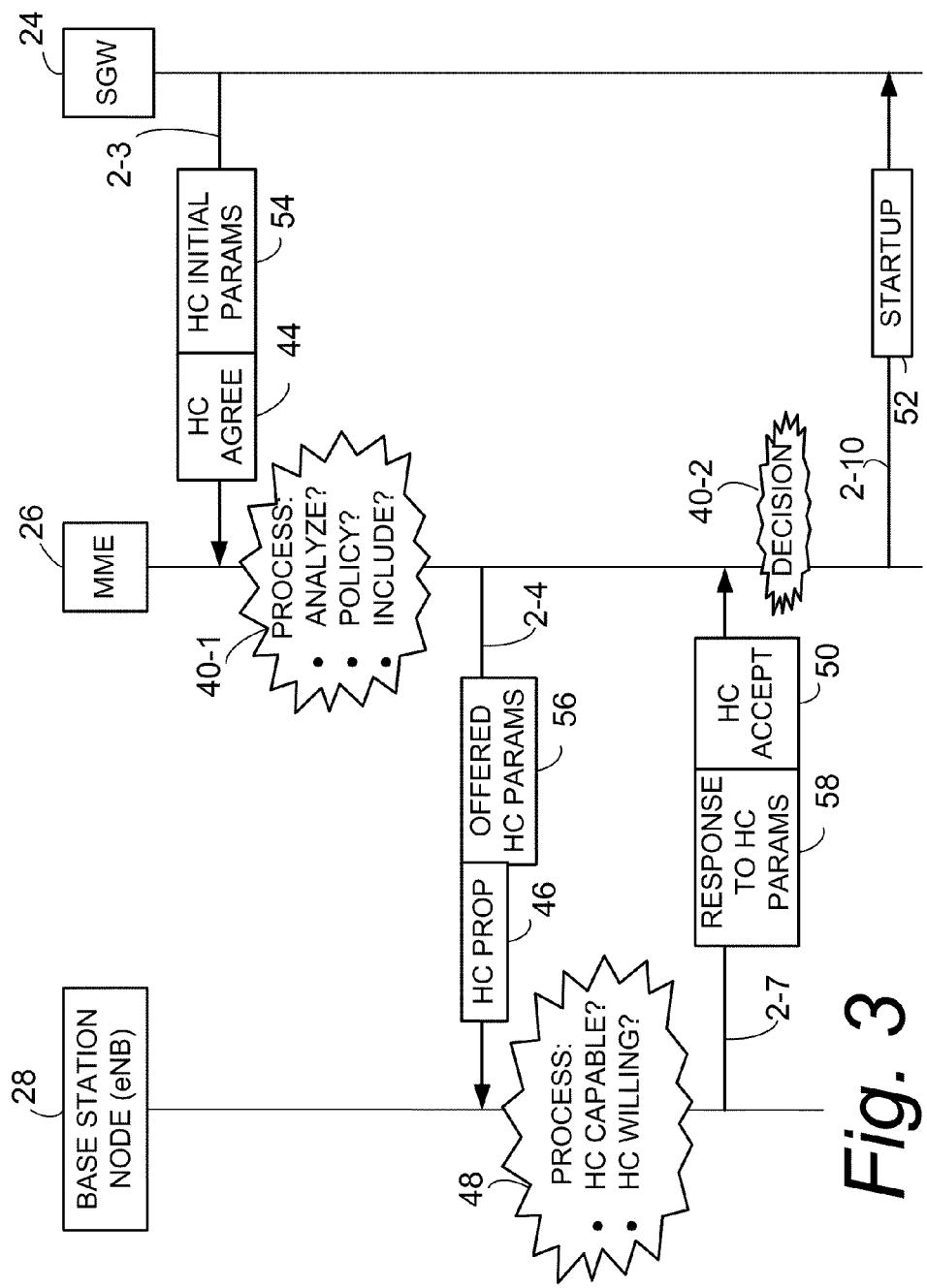
FIG. 3 is a diagrammatic view depicting another example embodiment and mode of signaling in a method of negotiating header compression on a backhaul link wherein a header compression initialization parameter is included in the signaling.

As understood with reference to FIG. 3, it is also possible to transmit additional parameters of header compression, such as available profiles, etc., to save header compression initialization time. This is possible since, before the exchange of the TEIDs, no packet can travel on the GTP connection.

In the above regard, FIG. 3 illustrates another example embodiment and mode of signaling in a method of negotiating header compression on a backhaul link, and particularly shows inclusion of a header compression initialization parameter in the signaling for negotiating use of header compression on the backhaul link. FIG. 3 includes the example acts of FIG. 2, but also shows that the message of act 2-3 further includes, in addition to header compression agreement indication 44, one or more offered header compression initialization parameters 54 that are proposed by serving gateway (SGW) 24 for use in the header compression over the backhaul link. FIG. 3 also shows that the message of act 2-4 sent from mobility management entity (MME) 26 to base station node 28 further includes an indication 56 of the header compression initialization parameter(s) offered by serving gateway (SGW) 24 for the header compression. FIG. 3 further shows that message of act 2-7 sent from base station node 28 to mobility management entity (MME) 26 further includes the base station node response 58 to the offered header compression initialization parameter(s). The header compression initialization parameter(s) negotiated and found as agreed by the mobility management entity (MME) 26 can be included in the startup indication 52 which is supplied by mobility management entity (MME) 26 to serving gateway (SGW) 24 in the message of act 2-10.

The header compression initialization parameter information included as the offered header compression initialization parameters 54; the indication 56 of the header compression initialization parameter(s) offered by serving gateway (SGW); the response 58 to the offered header compression initialization parameter(s); and any specification of the header compression initialization parameter(s) negotiated and found as agreed by the mobility management entity (MME) 26 can be included, for example, in one or more information element(s) of new or existing messages as reflected by the respective messages of acts 2-3, 2-4, 2-7, and 2-10, respectively.

Thus, as seen from FIG. 3, in an example mode and embodiment negotiating the use of header compression further comprises: (1) obtaining a header compression initialization parameter from the serving gateway node (e.g., as depicted by header compression initialization parameter 54); (2) obtaining a response from the base station node concerning the header compression initialization parameter (as depicted by base station node response 58 to the offered header compression initialization parameter(s)); and (3) using the response of act (2) to determine whether to implement the header compression on the backhaul link (as in, e.g., negotiation decision act 40-2).

Figure 4:
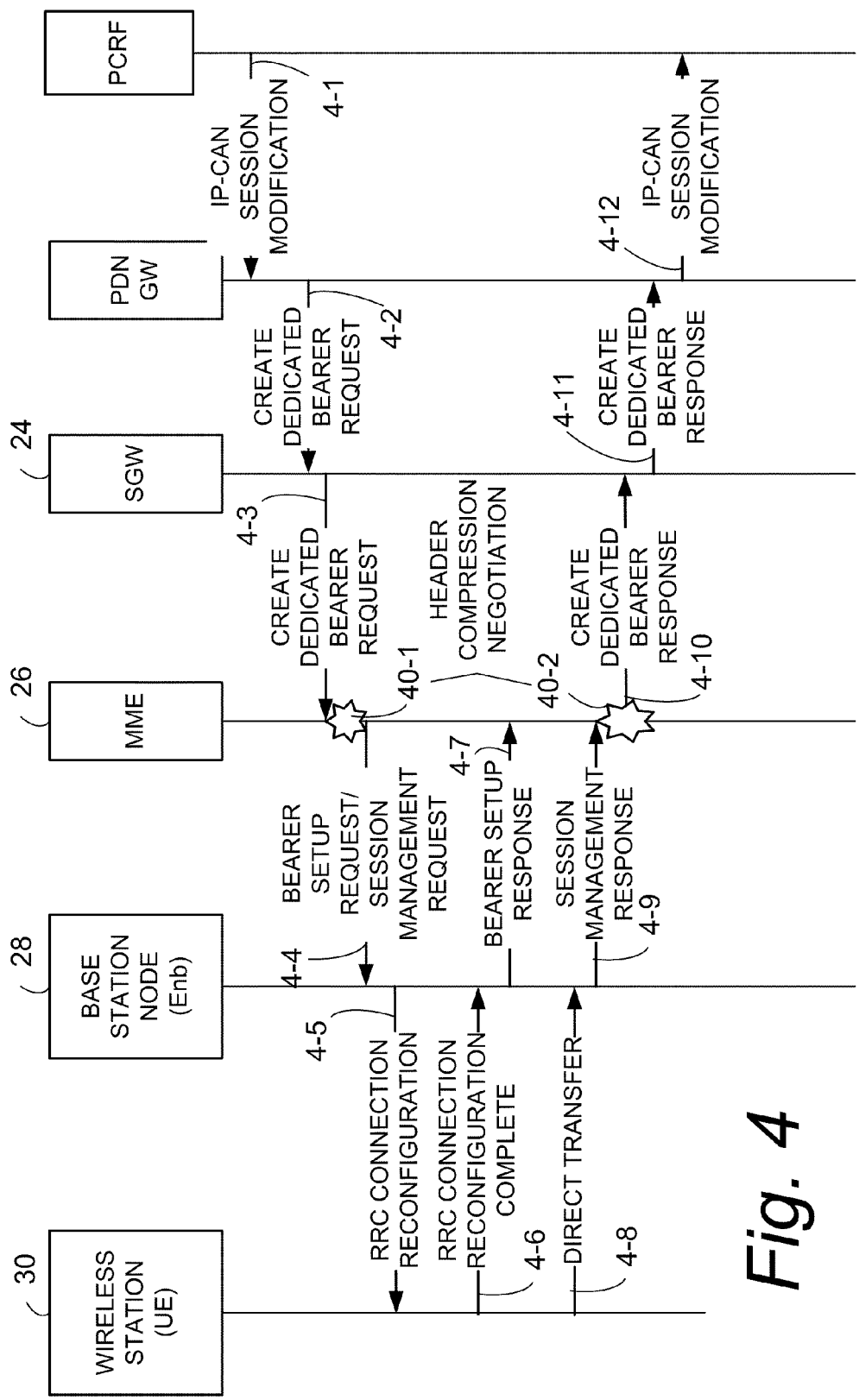
FIG. 4 is a diagrammatic view depicting how example embodiments and modes of signaling such as those of FIG. 2 and FIG. 3 can be included in a conventional bearer establishment procedure.
Figure 5:
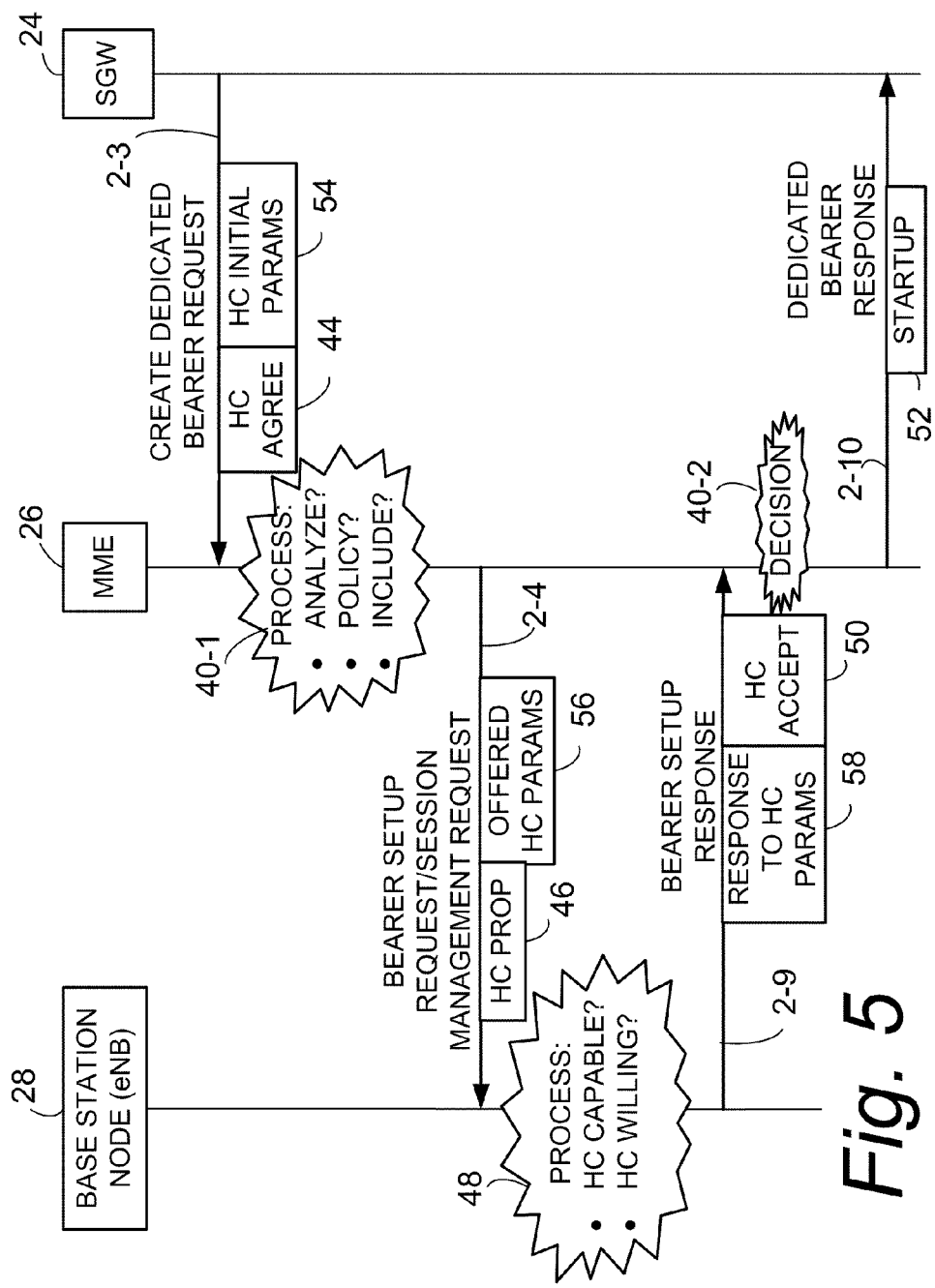
FIG. 5 is another diagrammatic view depicting how example embodiments and modes of signaling such as those of FIG. 2 and FIG. 3 can be included in a conventional bearer establishment procedure.

FIG. 4 and FIG. 5 illustrate in example manner how example embodiments and modes of signaling such as those of FIG. 2 and FIG. 3 can be included in a conventional bearer establishment procedure. In particular, FIG. 4 illustrates occurrence of negotiation processing act 40-1 and negotiation decision act 40-2 (which collectively comprise negotiation act 40) in the context of acts of the bearer establishment procedure described in 3GPP TS 23.401 V9.2.0 (2009-09), 3rd Generation Partnership Project; Technical Specification Group Services and System Aspects; General Packet Radio Service (GPRS) enhancements for Evolved Universal Terrestrial Radio Access Network (E-UTRAN) access (Release 9), which is incorporated herein by reference.

To accommodate such illustration, FIG. 4 further shows that evolved packet core (EPC) 20 comprises both Packet Data Network (PDN) gateway (PDN GW) and Policy and Charging Rules Function (PCRF). The PDN GW provides connectivity to the wireless terminal (UE) to external packet data networks by being the point of exit and entry of traffic for the wireless terminal (UE). A wireless terminal (UE) may have simultaneous connectivity with more than one PDN GW for accessing multiple PDNs. The PDN GW performs policy enforcement, packet filtering for each user, charging support, lawful Interception and packet screening. Another role of the PDN GW is to act as the anchor for mobility between 3GPP and non-3GPP technologies such as WiMAX.

In the implementation shown in FIG. 4 and understood also with respect to FIG. 5, the serving gateway (SGW) 24 attaches a new information element to the message of act 4-3 for the purpose of indicating ability and willingness of the serving gateway (SGW) 24 to do header compression (along with whatever parameters header compression initialization requires, in the manner depicted by header compression initialization parameter 54 of FIG. 3). The mobility management entity (MME) 26 ignores this indication if it is known that the eNodeB (e.g., base station node 28) does not support header compression or there is a policy decision not to apply header compression for this bearer. If header compression is desired and the serving gateway (SGW) 24 included such a new information element, the mobility management entity (MME) 26 includes that element in the message of act 4-4.

If the base station node 28 is also capable and willing to do header compression and the offered initialization parameters are compatible with base station node 28, then the base station node 28 also includes a new information element in the message of act 4-7 (along with the TEID), indicating capability and willingness of the base station node 28 to do header compression. Further, in the message of act 4-7 the base station node 28 may also include its response to the initialization parameters offered by the serving gateway (SGW) 24 (in the manner depicted by information element uplink signal processor 58 of FIG. 3). At this point, the decision to do header compression is made. Such decision is reflected by act 40-2. The mobility management entity (MME) 26, upon reception of the reply, notes that header compression applies to this bearer and includes the new information element sent by the base station node 28 in the message of act 4-10, thereby informing the serving gateway (SGW) 24 about the startup of header compression.

Since the mobility management entity (MME) 26 is in the middle of the signaling it can alter these signals, if the other end is known not to support header compression or if there is a policy decision not to do header compression on this bearer.

As shown by FIG. 4, the message of act 4-3 corresponds to the message of act 2-3 but in this specific implementation involves a message known as the dedicated bearer request message sent from serving gateway (SGW) 24 to mobility management entity (MME) 26. The message of act 4-4 corresponds to the message of act 2-4 but in this specific implementation involves a message known as the bearer setup request/session management request message sent from mobility management entity (MME) 26 to base station node 28. The message of act 4-7 corresponds to the message of act 2-7 but in this specific implementation involves a message known as the bearer setup response message. The message of act 4-10 corresponds to the message of act 2-10 but in this specific implementation involves a message known as the dedicated bearer response message.

FIG. 5 resembles FIG. 3 but assigns names to the messages in accordance with the 3GPP TS 23.401 V9.2.0 (2009-09) example implementation.

Figure 6:
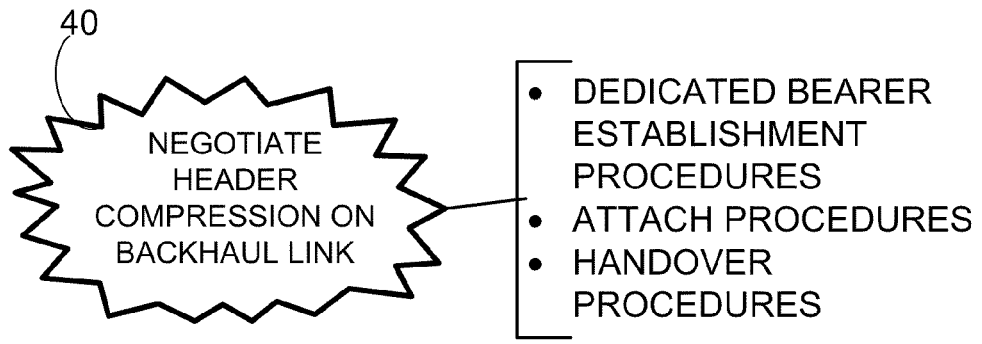
FIG. 6 is a diagrammatic illustrating that negotiation of header compression on a backhaul link according to embodiments encompassed hereby apply to dedicated bearer establishment procedures, attach procedures, handover procedures, or other procedures where bearers are to be established.

The foregoing explanations of FIG. 2-5 have been provided primarily in the context of a dedicated bearer establishment procedure, but (as illustrated by FIG. 6) also apply to attach procedures, handover procedures, or other procedures where bearers are to be established.

Figure 7:
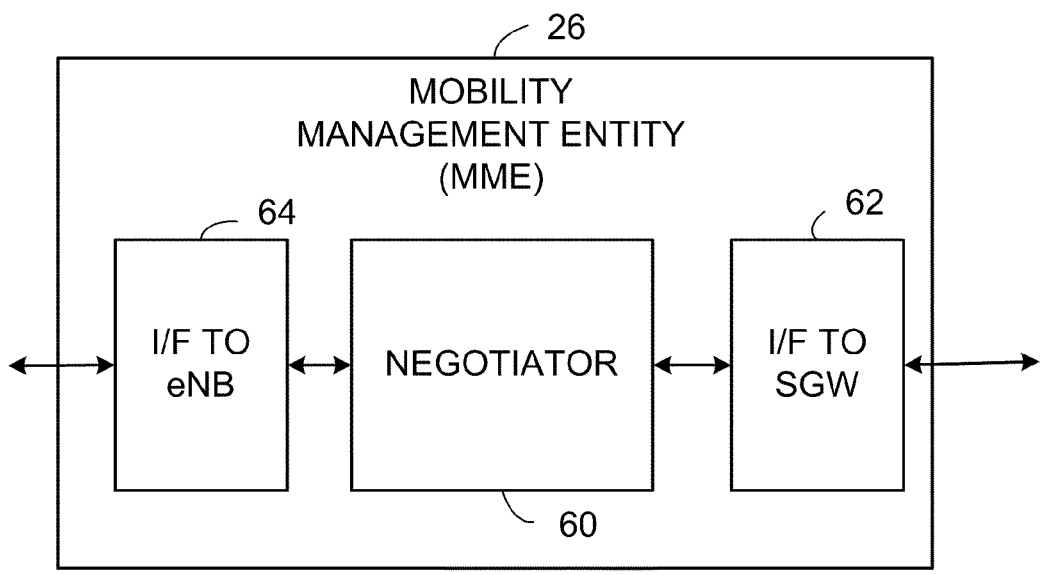
FIG. 7 is a schematic view of an example mobility management entity configured to perform negotiation of header compression on a backhaul link.

FIG. 7 shows an example embodiment of a mobility management entity 26 which configured to perform negotiation of header compression on a backhaul link. The mobility management entity (MME) 26 comprises negotiator 60, also known as a negotiation functionality or negotiation unit. The negotiator 60 can take the form of a computer, processor, or controller (as those terms are expansively elaborated herein) and thus can execute a computer program product comprising instructions stored on electromagnetic media which, when executed, perform acts of the method(s) described herein. The negotiator 60 is connected between SGW interface unit 62 (which connects mobility management entity (MME) 26 to serving gateway (SGW) 24 over the S11 interface) and the eNB interface unit 64 (which connects mobility management entity (MME) 26 to base station node 28 over the S1-MME interface).

It will be appreciated that the mobility management entity (MME) 26 such as that shown in FIG. 7 is a control-node for the LTE access-network, and has many functions for which corresponding units or functionalities are not necessarily all shown in FIG. 7. For example, mobility management entity (MME) 26 is responsible for idle mode UE tracking and paging procedure including retransmissions. The mobility management entity (MME) 26 is involved in the bearer activation/deactivation process and is also responsible for choosing the SGW for a wireless terminal (UE) at the initial attach and at time of intra-LTE handover involving Core Network (CN) node relocation. The 26 mobility management entity (MME) 26 is responsible for authenticating the user (by interacting with the HSS). The Non-Access Stratum (NAS) signaling terminates at the mobility management entity (MME) 26, and the mobility management entity (MME) 26 is also responsible for generation and allocation of temporary identities to wireless terminals (UE). The mobility management entity (MME) 26 checks the authorization of the wireless terminal (UE) to camp on the service provider's Public Land Mobile Network (PLMN) and enforces wireless terminal (UE) roaming restrictions. The mobility management entity (MME) 26 is the termination point in the network for ciphering/integrity protection for NAS signaling and handles the security key management. Lawful interception of signaling is also supported by the mobility management entity (MME) 26. The mobility management entity (MME) 26 also provides the control plane function for mobility between LTE and 2G/3G access networks with the S3 interface terminating at the mobility management entity (MME) 26 from the SGSN. The mobility management entity (MME) 26 also terminates the S6a interface towards the home HSS for roaming UEs.

Thus far described are embodiments and modes wherein the header compression occurs over a backhaul link that does not involve a radio interface (between the base station node 28 and the serving gateway (SGW) 24) or radio link (between the base station node 28 and the serving gateway (SGW) 24). The header compression techniques of the embodiments and modes thus far described have numerous features and advantages.

Header compression inside the transport General Packet Radio service Tunneling Protocol (GTP) tunnel becomes even more important in case of relaying, also called self-backhauling. In relaying, the backhaul connection of the relay (i.e., a self-backhauled eNB) is provided via the radio interface. In the case of relaying the General Packet Radio service Tunneling Protocol (GTP) tunnel traverses the resource-scarce backhaul radio interface. There are different architectural solutions to integrate a relay node and the self-backhauled link into the existing LTE protocol and network architecture. See, for instance, commonly-assigned PCT application, PCT/SE2008/051004, filed on Sep. 9, 2009, and entitled "SELF-BACKHAULING IN LTE," the contents of which are incorporated herein by reference, for possible options. Common to these solutions is that the GTP tunnel to the relay node is transferred via the self-backhauled radio link, which means that an additional GTP/UDP/IP overhead outer header is used along with the end user IP inner header. The legacy PDCP layer of the backhaul radio link can compress only the outer header, while the inner header remains uncompressed.

Figure 8:
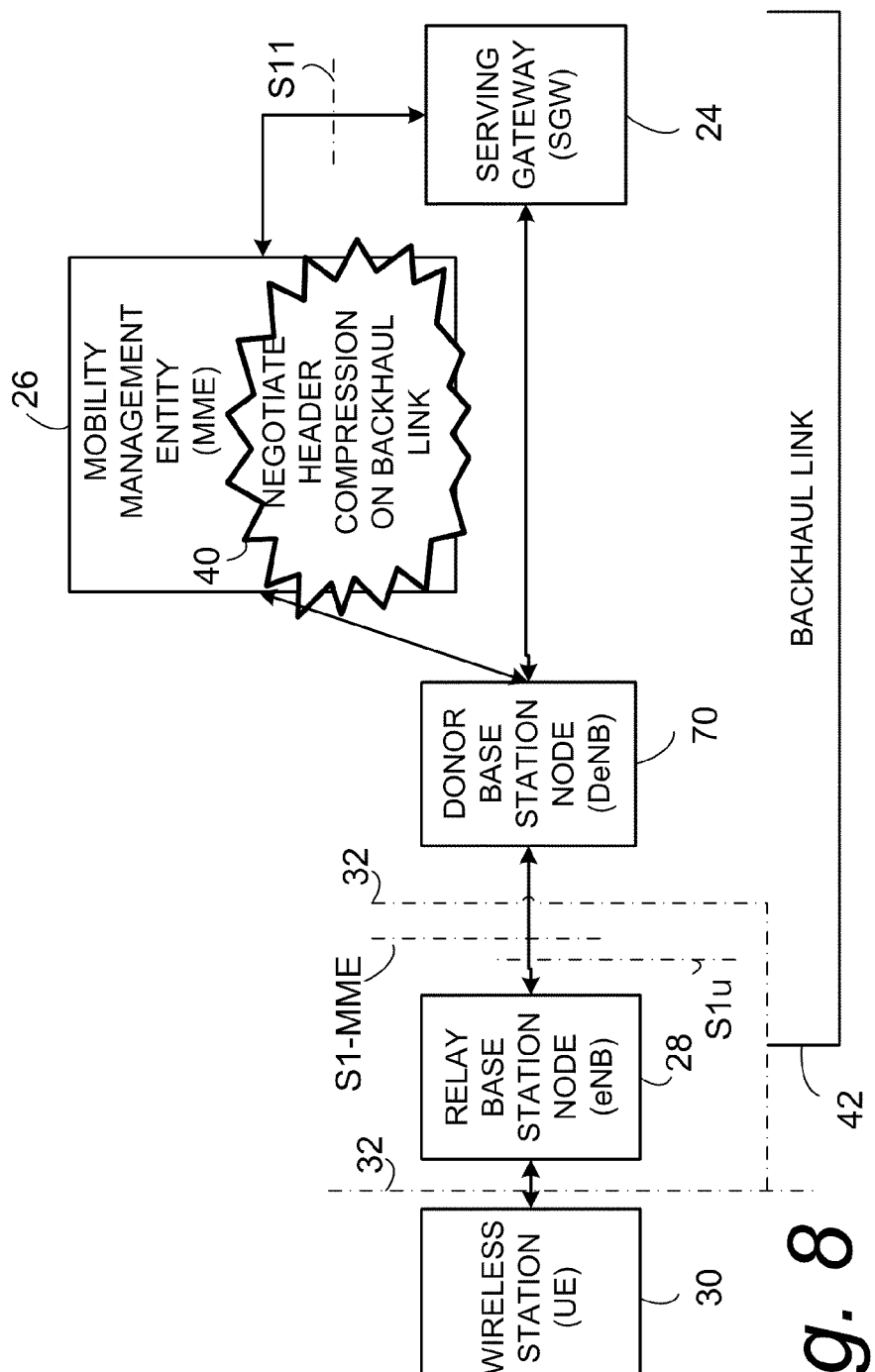
FIG. 8 is schematic view of a generic case of use of a relay node or self-backhauled base station node in a telecommunications network and further showing negotiation of header compression on a backhaul link.

FIG. 8 depicts a generic relay use case involving header compression inside the GTP tunnel. The generic case as illustrated by FIG. 8 can be important when relaying or self-backhauling, where the relay node (also called self-backhauled eNodeB) is connected to the network via the LTE radio interface. The terms "relay node" and "relay base station" are used interchangeably herein. FIG. 8 particularly shows inclusion of a donor base station node 70 (DeNB) positioned between mobility management entity (MME) 26 and base station node 28, with donor base station node 70 communicating over radio interface 32 with base station node 28.

FIG. 8 thus generically represents embodiments, modes, and aspects the technology disclosed herein which comprise negotiating header compression on the backhaul link when the backhaul link comprises a radio link. Described hereinafter are illustrations of the use of example header compression over the backhaul link in two non-limiting and example architecture cases/options of relay integration into the LTE architecture.

Figure 8A:
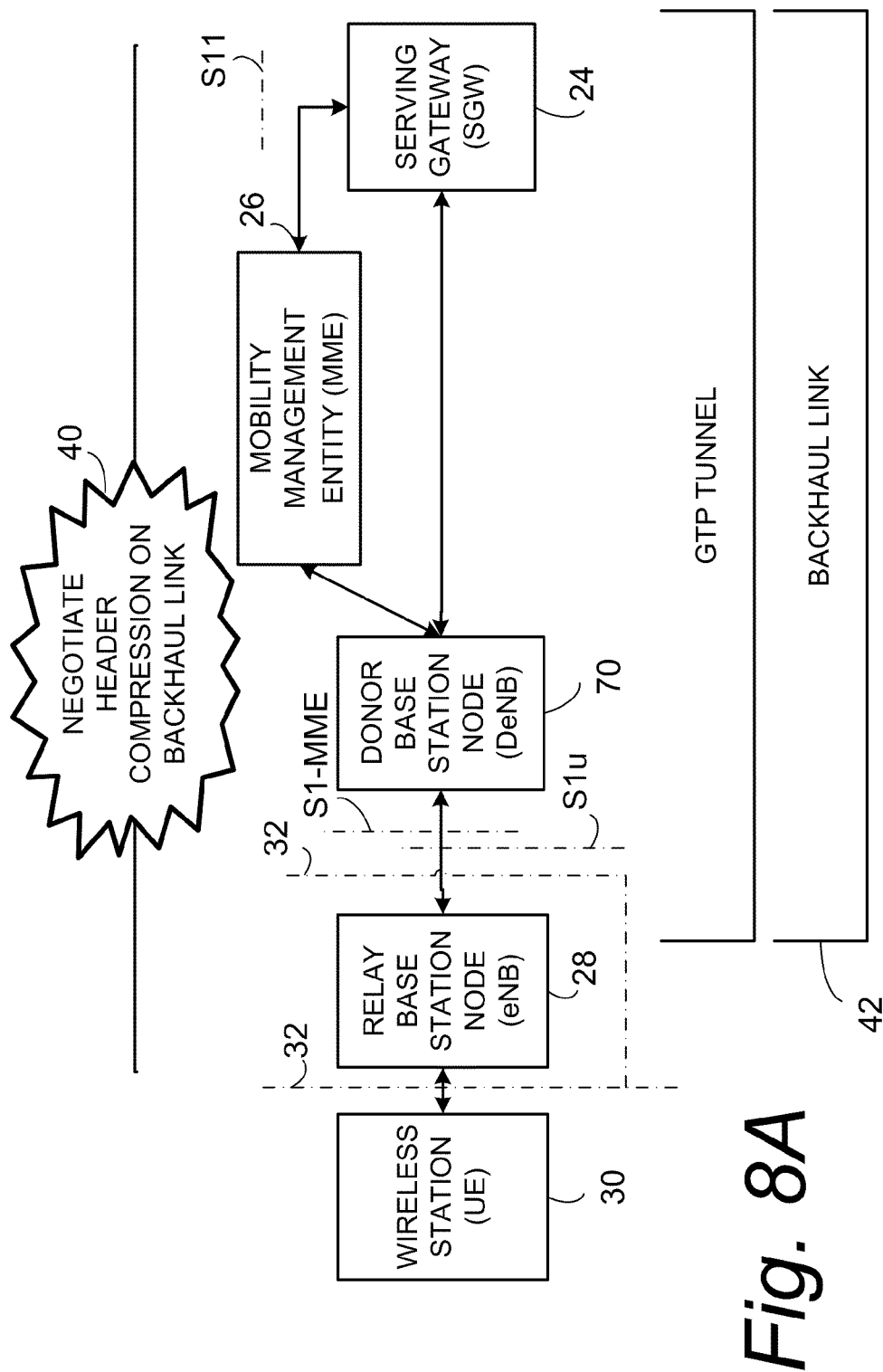
FIG. 8A is schematic view depicting a bearer encapsulation implementation for negotiation of header compression on a backhaul link when using a relay node or self-backhauled base station node in a telecommunications network.

FIG. 8A illustrates a first example relaying architecture solution which corresponds to full-layer 3 (L3) relaying, i.e., to a bearer encapsulation approach. A simplified protocol stack focusing on the header compression function for the Full-L3 relaying architecture alternative (bearer encapsulation approach) of FIG. 8A is shown in FIG. 9A.

Figure 9A:
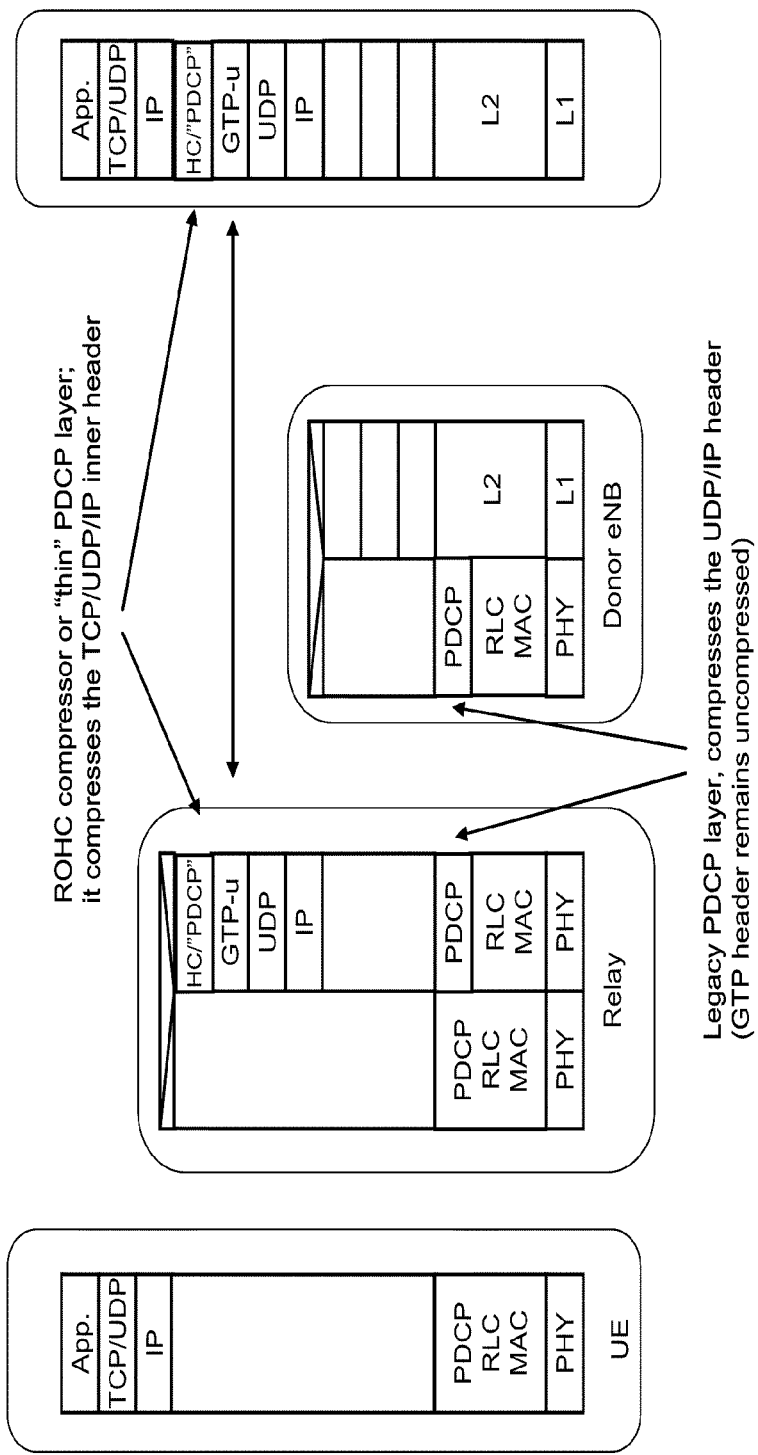
FIG. 9A is a diagrammatic view of a protocol stack suitable for the bearer encapsulation implementation of FIG. 8A for header compression over a backhaul link in a self-backhauled base station node.

Specific to the architecture option of FIG. 9A is that the General Packet Radio service Tunneling Protocol (GTP) tunnel corresponding to the UE bearer spans from the serving gateway (SGW) 24 serving the wireless terminal (UE) 30 to the relay node 28 (going transparently via the donor eNB 70). As such, the endpoints of the tunnel are at the serving gateway (SGW) 24 and at the relay (base station node 28), which means that additional header compressors inside the General Packet Radio service Tunneling Protocol (GTP) tunnel are located at the relay (base station node 28) and at the serving gateway (SGW) 24, as shown in FIG. 9A. The additional compressors inside the base station node 28 and inside the serving gateway (SGW) 24 are reflected by the protocol elements "HC/PDCP" in FIG. 9A. These compressors can take the form of a computer-implemented compression unit or functionality.

In the full-L3 relaying technique of FIG. 9A the legacy PDCP layer compresses the UDP/IP header. That is, the Packet Data Convergence Protocol (PDCP) layer on the backhaul link corresponds to the legacy PDCP protocol in LTE and can perform the compression of the User Datagram Protocol/Internet Protocol (UDP/IP) header of the GTP packets between the relay node (relay base station) 28 and the donor base station node 70. But what now needs to be compressed is not the GTP header but rather the IP headers or "inner headers" of the packet that is carried inside a GTP tunnel. The TCP/UDP/IP inner header is compressed by the aforementioned "HC/PDCP" compressors in the serving gateway (SGW) 24 and the base station node 28.

The header compressors in the serving gateway (SGW) 24 and in the relay node (base station node 28) do not have to be, for example, a new layer in the protocol stack of the nodes, but can be header compressor state machines in the corresponding nodes. Alternatively, the header compression may be implemented as a new "thin" PDCP layer, if some additional information field(s) need(s) to be conveyed. The configuration of the header compressors in the serving gateway (SGW) 24 and in the relay node (RN) can be performed from the serving gateway (SGW) 24, as explained for the generic case earlier. The configuration of the header compressors comprises the negotiation process described herein including the optional exchange of parameters.

Thus, in the example mode and embodiments of FIG. 8A and FIG. 9A the backhaul link comprises a General Packet Radio service Tunneling Protocol (GTP) tunnel between the serving gateway node (24) and the relay base station node (base station node 28). The General Packet Radio service Tunneling Protocol (GTP) tunnel traverses a radio interface 32 between the relay base station node 28 and the donor base station node 70. In such example mode and embodiment the method further comprises handling signaling between the serving gateway node 24 and the relay base station node 70 for negotiating the use of the header compression inside the General Packet Radio service Tunneling Protocol (GTP) tunnel.

Figure 8B:
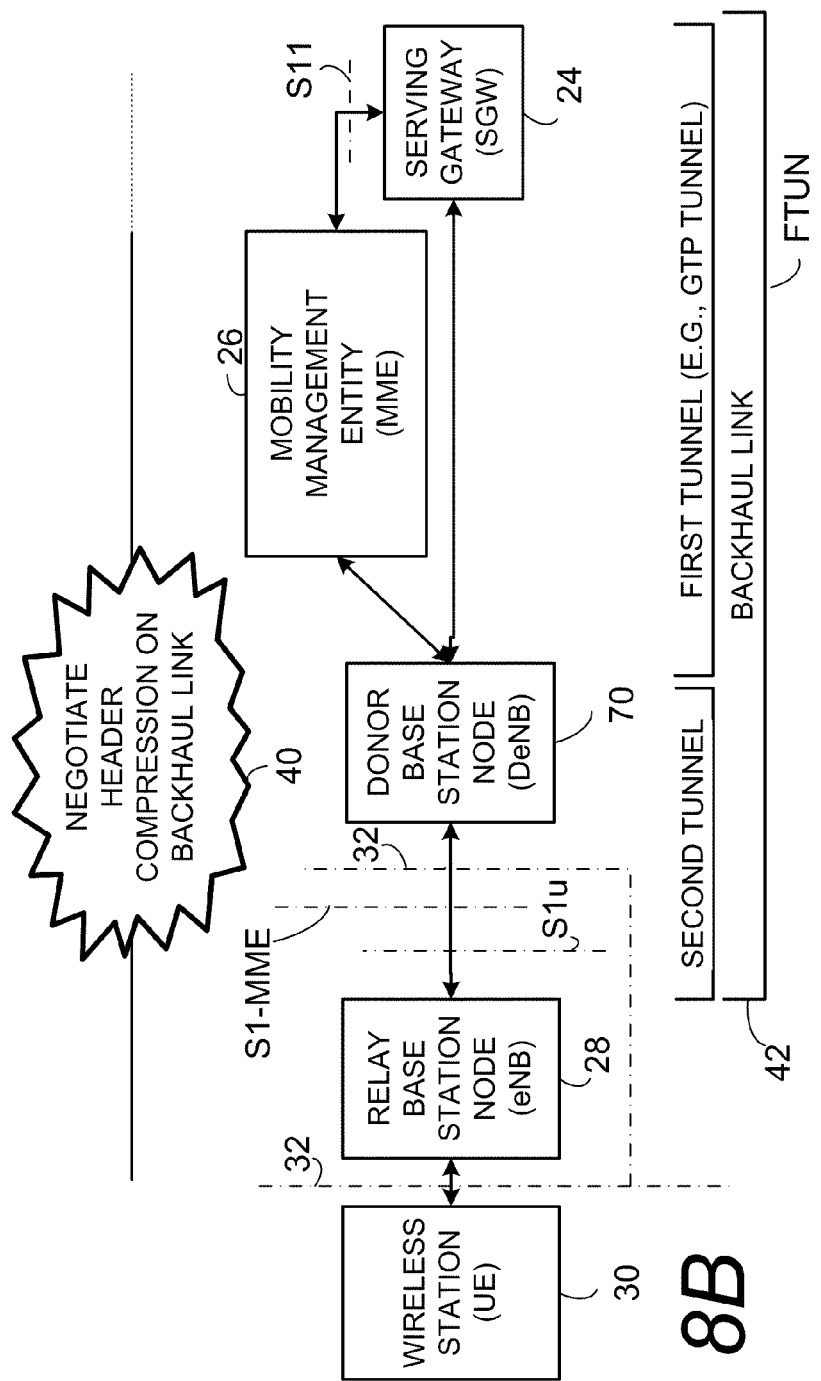
FIG. 8B is schematic view depicting a proxy implementation for negotiation of header compression on a backhaul link when using a relay node or self-backhauled base station node in a telecommunications network.
Figure 9B:
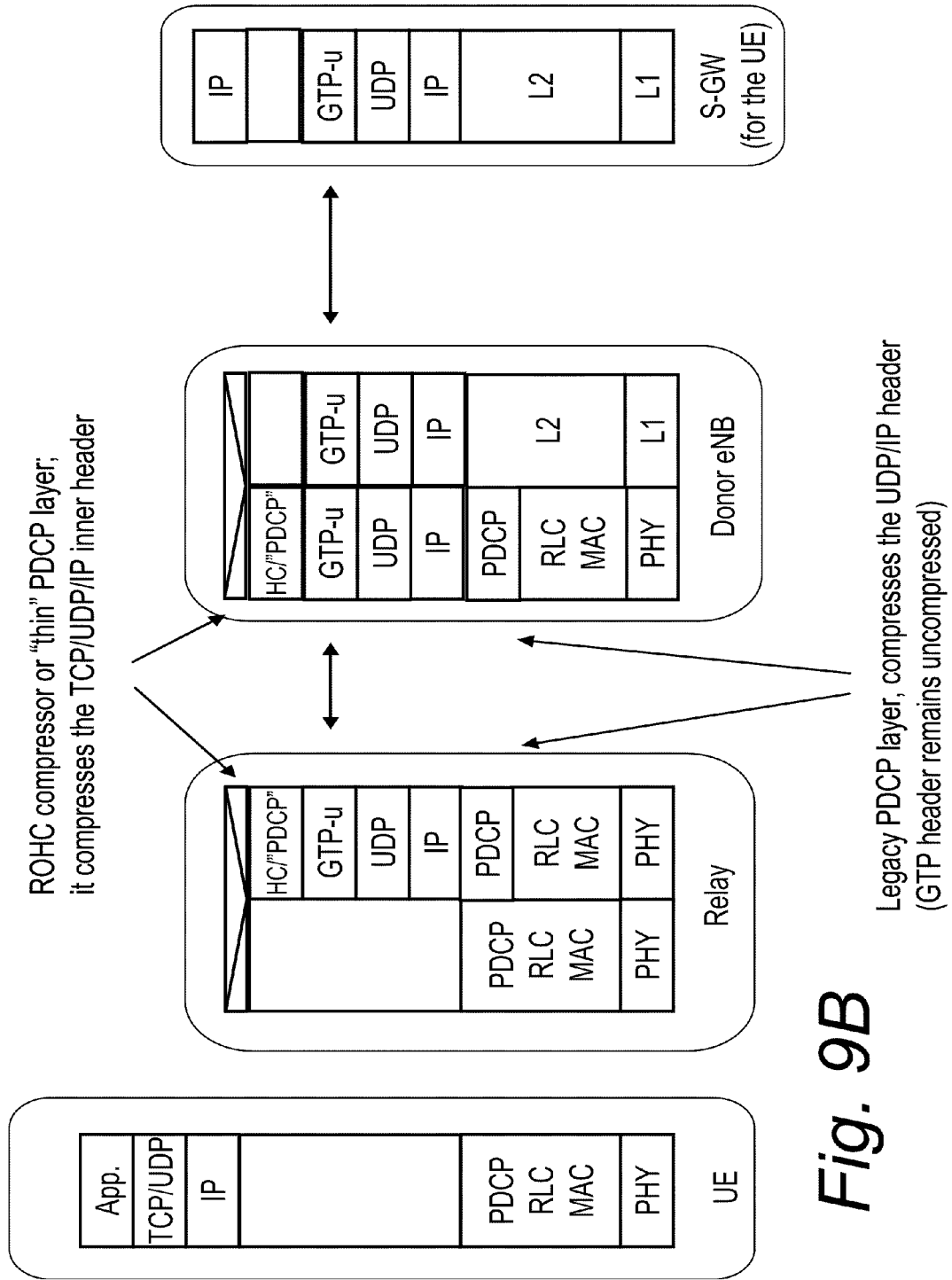
FIG. 9B is a diagrammatic view of a protocol stack suitable for the proxy implementation of FIG. 9A for header compression over a backhaul link in a self-backhauled base station node.

A second non-limiting example relaying architecture solution uses a proxy approach in a manner such as that illustrated in FIG. 8B. The protocol stack in case of the proxy relaying architecture approach is shown in FIG. 9B. A first tunnel (known as the GTP tunnel) extends from the serving gateway (SGW) 24 to the donor eNB 70, and another (e.g., a second) tunnel is used from the donor eNB 70 to the relay (e.g., to base station node 28). Tunnel switching takes place in the donor eNB 70. Tunnel switching means that one tunnel is terminated and continued in another (second) tunnel, which second tunnel has a different tunnel identifier (tunnel ID), so that a switch occurs from the first tunnel to the second tunnel. Having two separate tunnels, i.e., one (first) tunnel between the serving gateway (SGW) 24 and the donor eNB 70 and another (second) tunnel between the donor eNB 70 and the relay (e.g., base station node 28), enables use of extra header compression only for the donor eNB-Relay link (e.g., the link between base station node 28 and donor base station node 70) for implementations which desire header compression only on the second tunnel. Advantageously this implementation with header compression only on the second tunnel leaves the serving gateway (SGW) 24 unmodified (i.e., no need for the extra header compression support in legacy SGW nodes). However, in other implementations the extra header compression may optionally be deployed on first tunnel as well from the SGW to the donor base station node eNB 70 (e.g., may optionally be employed on the first tunnel in addition to the header compression on the second tunnel), i.e., between the SGW and the relay as in the previous case (as shown by the dotted line in FIG. 8B).

Thus, in the example modes and embodiments such as those described with reference to FIG. 8B and FIG. 9B, the backhaul link comprises a first tunnel (e.g., a General Packet Radio service Tunneling Protocol (GTP) tunnel) between the serving gateway node and a donor base station node and a further (e.g., second) tunnel extending between the donor base station node and the relay base station. The second tunnel may also be a GTP tunnel, but unless otherwise specified herein for the FIG. 8B and FIG. 9B embodiment the designation of "General Packet Radio service Tunneling Protocol (GTP) tunnel" refers to the first tunnel, i.e., the tunnel between the serving gateway node and the donor base station node. The second tunnel traverses a radio interface between the relay base station node and the donor base station node. In the embodiments of FIG. 8B and FIG. 9B the method further comprises handling signaling between the donor base station node and the relay base station node for negotiating the use of the header compression inside the second tunnel, as well as optionally handling signaling between the serving gateway node and the donor base station node for negotiating the use of the header compression inside the first tunnel (e.g., the General Packet Radio service Tunneling Protocol (GTP) tunnel).

Figure 10:
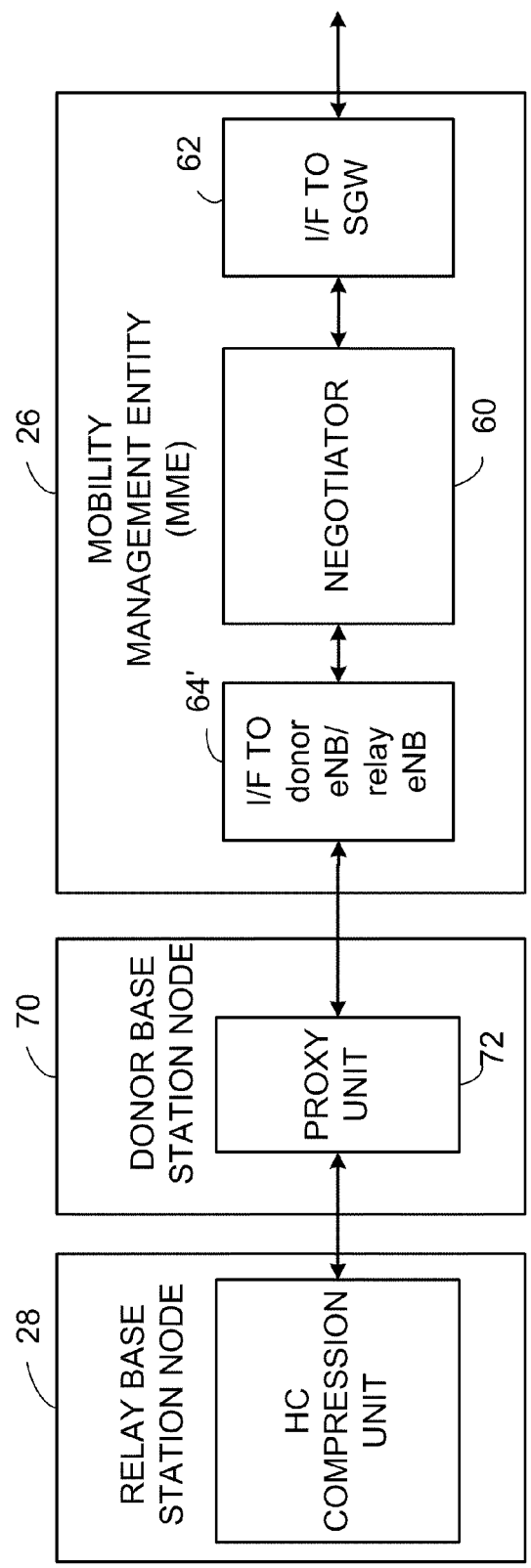
FIG. 10 is a schematic view of portions of a mobility management entity (MME); portions of a donor base station node; and portions of a self-backhauled relay base station node.

For "relay" or "self-backhauled" cases such as those of FIG. 8A and FIG. 8B, the signaling mechanism used to configure the header compressors in the donor base station node 70 (or in the serving gateway (SGW) 24) and in the relay base station node 28 may need to be slightly modified as compared to the general (non-relay) cases discussed above. For example, as illustrated in FIG. 10, the signaling between the mobility management entity (MME) 26 and the relay (e.g., 28) is also delivered via a proxy function 72 in the donor base station node 70. In other words, the mobility management entity (MME) 26 talks (via the SGW interface unit 62) to the serving gateway (SGW) 24 on one hand, and on the other hand the mobility management entity (MME) 26 talks to the donor base station node 70 (via an interface unit 64'). The mobility management entity (MME) 26 and the interface unit 64' understand that the mobility management entity (MME) 26 talks to the base station node 28 through the donor base station node 70, and not directly to the relay node (not directly to base station node 28). The negotiation between donor eNB (or regular eNB in case of no proxy solution) and the serving GW is handled via the MME, e.g., the serving GW and the donor eNB do not exchange signaling message between each other directly.

Figure 11:
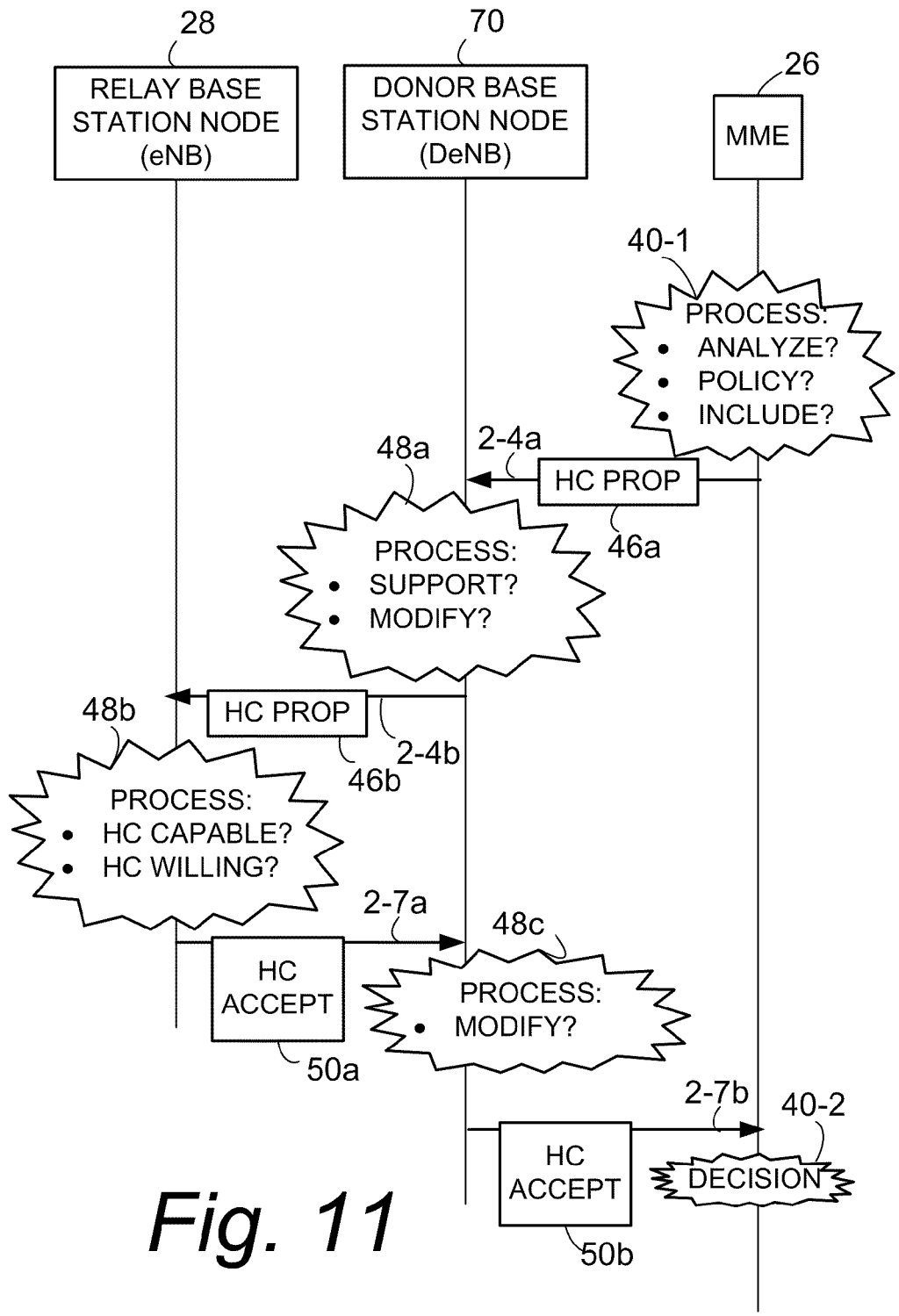
FIG. 11 is a diagrammatic view depicting an example embodiment and mode of signaling in a method of negotiating header compression on a backhaul link which includes a radio link and which involves a donor base station node.

FIG. 11 reflects an example manner in which signaling can be modified in a case in which the header compression for the GTP tunnel is between the donor base station node 70 and the relay base station node 28. Upon receiving the S1 signaling message from the mobility management entity (MME) 26 (e.g., a message such as that of act 2-4 of FIG. 2, labeled as the message of act 2-4a in FIG. 11) containing the configuration for the header compression, as act 48a the donor base station node 70 determines if it can support the configuration given by the mobility management entity 26. As part of act 48a the donor base station node 70 may modify the header compression configuration in the S1 message before forwarding it toward the relay base station node 28 (as depicted by message 2-4b). The relay base station node 28 obtains the header compression configuration from the S1 message as received from the donor base station node 70; determines (as act 48b) if the relay base station node 28 can support the configuration; and replies accordingly (as depicted by the message of act 2-7a). Based on the reply from the relay base station node 28, as act 48c the donor base station node 70 may need to modify the header compression configuration it will apply. As act 2-7b the donor base station node 70 thus forwards the response on toward the mobility management entity (MME) 26.

Figure 12:
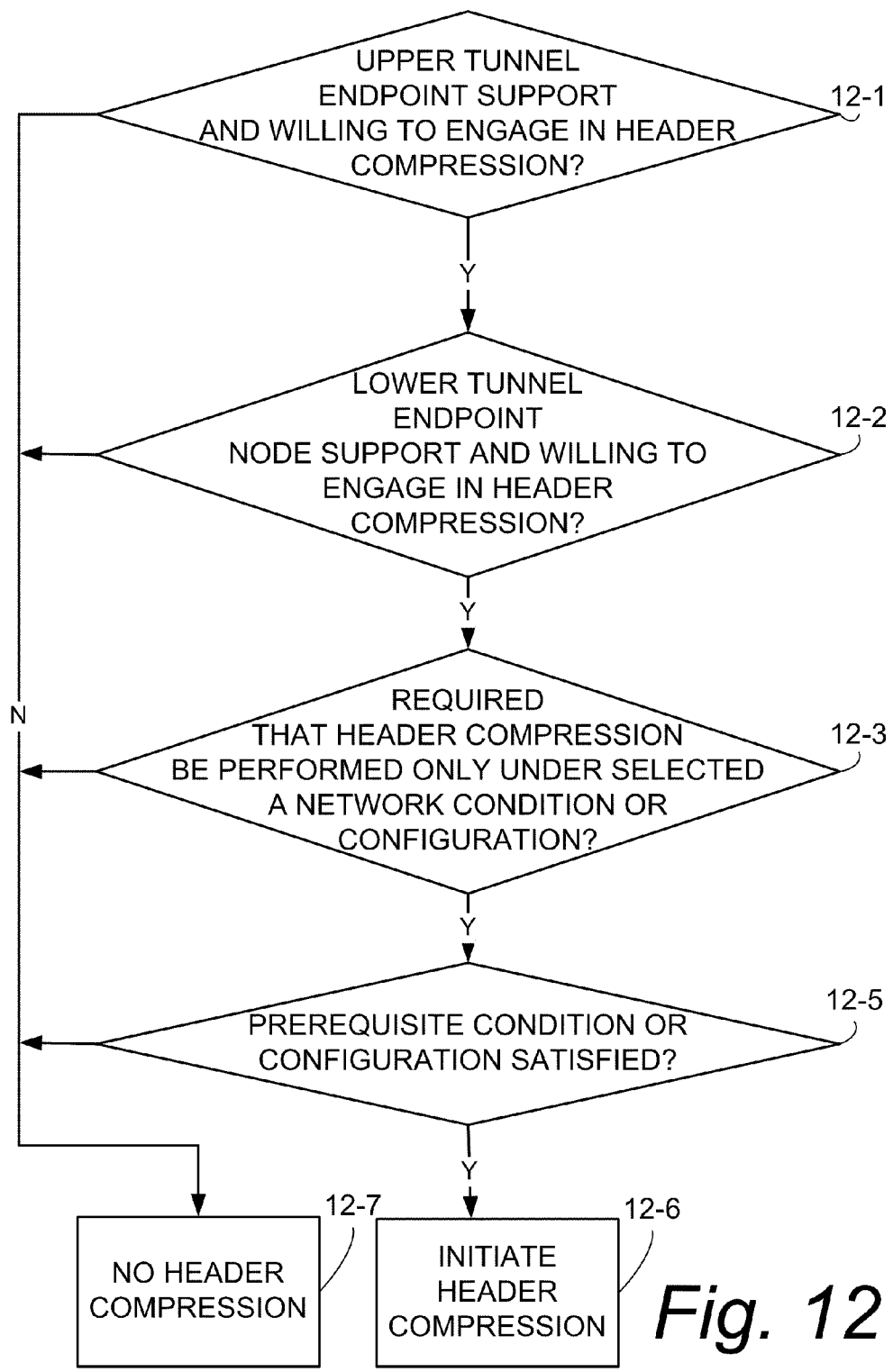
FIG. 12 is a flowchart showing example steps or acts that can be performed in determining whether to perform header compression over a backhaul link.

In some example embodiments and modes a decision whether to activate the use of the header compression may depend on a contingency relating to network configuration. In this regard, FIG. 12 shows example steps or acts that can be performed by the negotiator 60 of mobility management entity (MME) 26 in determining whether to perform header compression over a backhaul link between a lower tunnel endpoint (such as a base station node, e.g., base station node 28) and an upper tunnel endpoint (such as a serving gateway (SGW), e.g., serving gateway (SGW) 24).

As act 12-1 the negotiator 60 determines whether the upper tunnel endpoint (e.g., (SGW) 24) supports and is willing to engage in header compression. Information indicative of whether the upper tunnel endpoint supports and is willing to engage in header compression can be obtained from an information element or other field of a message such as the message of act 2-3, for example. If the upper tunnel endpoint does not offer or agree to header compression support, the negotiation can be ended and header compression is not performed.

Act 12-2 comprises the negotiator 60 determining whether the lower tunnel endpoint (e.g., base station node 28) supports or is willing to engage in header compression. Information indicative of whether the lower tunnel endpoint supports or is willing to engage in header compression can be obtained from an information element or other field of a message such as the message of act 2-7, for example. If the lower tunnel endpoint does not offer or agree to header compression support, the negotiation can be ended and header compression is not performed.

Act 12-3 comprises the negotiator 60 checking whether there is a requirement that header compression be performed only under selected a network condition or configuration. If no particular network condition or network configuration is required, then the header compression may be set up and initiated as indicated by act 12-4. But if a particular network condition or network configuration is required as a prerequisite to header compression, as act 12-5 the negotiator 60 checks whether the prerequisite condition or configuration is satisfied. If the prerequisite condition or configuration is not satisfied, the negotiation is ended and header compression is not performed. However, if the prerequisite condition or configuration is satisfied, the header compression is initiated as indicated by act 12-6.

One example of a prerequisite condition or configuration is that the backhaul link comprise a radio link. In other words, in an example mode and embodiment a decision whether to activate the use of the header compression depends on whether the backhaul link comprises radio link. Input for such decision can be obtained or known from network configuration data as configured in the MME by an Operation and Management (O&M) system, for example.

Another example of a prerequisite condition or configuration is that the backhaul link comprise a transport link having a transport capacity below a predetermined value. That is, this other example mode and embodiment comprises activating the use of the header compression when the backhaul link comprises a transport link having a transport capacity below a predetermined value. The MME knows the transport capacity of the links comprising the backhaul link since the Operation and Management (O&M) system collects information about the network and configures the MME for header compression in case of certain base stations.

In another of its aspects the technology disclosed herein concerns a method in a base station node of a telecommunications network. The method comprises the base station node determining (as by act 48 of FIG. 2, for example) whether there is agreement for use of header compression over at least a portion of a backhaul link. The method further comprises the base station node transmitting a message which is indicative of the agreement, as reflected by the message of act 2-7 of FIG. 2, for example.

An example mode and embodiment of the method in the base station node further comprises providing in the message a response to an offer of a header compression initialization parameter offered by the serving gateway node. An example of such response to offer is the response to parameter offer information 58 of the message of act 2-7.

In an example mode and embodiment of the method in the base station node, the base station node is a relay base station node and the backhaul link comprises a General Packet Radio service Tunneling Protocol (GTP) tunnel extending between the serving gateway node and the relay base station node. The General Packet Radio service Tunneling Protocol (GTP) tunnel traverses a radio interface between the relay base station node and a donor base station node. The method in the base station node further comprises compressing a UDP/IP header of packets traversing the General Packet Radio service Tunneling Protocol (GTP) tunnel from the relay base station node to the donor base station node; and compressing a TCP/UDP/IP inner header of packets traversing the General Packet Radio service Tunneling Protocol (GTP) tunnel from the serving gateway node to the relay base station node.

Figure 15:
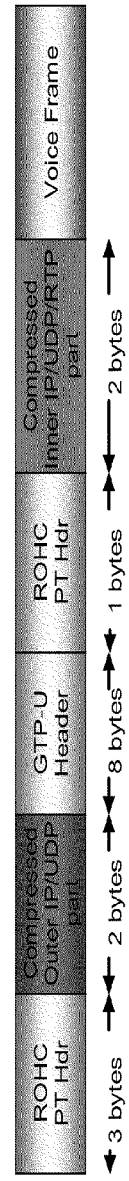
FIG. 15 is a diagrammatic view illustrating wherein a GTP-U header is left uncompressed, with one header compression instance compressing IP headers inside the GTP-U tunnel while another instance compresses outer IP headers.

In one of its aspects the technology disclosed herein provides support in GTP-U for performing header compression inside a tunnel, e.g. to support a ROHC channel inside the GTP-U tunnel. In so doing, the GTP-U header could be left uncompressed: one header compression instance would compress IP headers inside the GTP-U tunnel while another instance would compress the outer IP headers as shown in FIG. 15. In an example implementation 76/96 bytes (assuming IPv4/IPv6) could be compressed down to some 16 bytes (assuming that a large CID space and UDP checksum in both the inner and outer levels are used). Knowing the MME coordinates the GTP tunnel establishment, and that S1-AP is used to setup the GTP tunnel towards the eNB and that GTP-C is used towards the Serving GW (S11), this implementation requires that support for the configuration of header compression over GTP-U be added to the S1 procedure and to the GTP-C procedure. This minimally requires the addition of a packet type of ROHC packets over the relevant interfaces (e.g. using a new packet type ID in the GTP message type field). Other considerations such as whether or not bidirectional compression (i.e. use of feedback) is possible, in addition to unidirectional compression, should also be verified (EPS bearers are bidirectional). Specifying support for header compression inside GTP tunnels requires modifications to GTP-C and S1-AP procedures (thus involving RAN3). Another aspect is the possibility to reuse existing header compression implementations.

Some of the example advantages of the technology disclosed in this application include: (1) backwards compatible setup of header compression inside a GTP tunnel over expensive S1 backhaul links, (2) seamless fallback in case of non-supporting equipment or if one of the ends runs out of header compression resources, (3) use of mixed modes on a per bearer basis, and (4) especially useful in LTE relay applications when the S1 link itself may be transported over the LTE radio interface.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of managing header compression in a telecommunications network comprising:
    negotiating use of header compression over at least a portion of a backhaul link, wherein the backhaul link comprises: (i) a first tunnel having a first tunnel identifier and extending between a serving gateway node of the telecommunications network and a donor base station node and (ii) a second tunnel having a second tunnel identifier and extending between the donor base station node and a relay base station node, and wherein the second tunnel traverses a radio interface between the relay base station node and the donor base station node, the negotiating comprising:
        receiving a first signaling message at a mobility management entity, the first signaling message indicating whether the serving gateway node agrees to use header compression;
        receiving a second signaling message at the mobility management entity, the second signaling message indicating whether the donor base station agrees to use header compression;
    receiving, at the donor base station node, a packet transmitted over the first tunnel, wherein the received packet comprises an outer internet protocol (IP) header and an inner IP header;
    compressing the inner IP header of the packet; and
    switching the packet from the first tunnel to the second tunnel for transmission to the relay base station node.

2. The method of claim 1, wherein negotiating use of header compression comprises:
    (1) ascertaining whether the serving gateway node agrees to use header compression;
    (2) ascertaining whether the donor base station node agrees to use header compression; and
    (3) using (1) and (2) to determine whether to implement the header compression on the first tunnel.

3. The method of claim 1, wherein the first tunnel comprises a General Packet Radio service Tunneling Protocol (GTP) tunnel between the serving gateway node and the donor base station node, wherein header compression is applied for packets carried inside the GTP tunnel.

4. The method of claim 1, further comprising:
    (a) obtaining a header compression initialization parameter from the serving gateway node;
    (b) obtaining a response from the donor base station node concerning the header compression initialization parameter; and
    (c) using the response of act (b) to determine whether to implement header compression on the first tunnel.

5. The method of claim 1, further comprising negotiating use of header compression on the backhaul link upon performance of any one of a bearer establishment procedure; an attachment procedure; or a handover procedure.

6. The method of claim 1, further comprising handling signaling between the donor base station node and the relay base station node for negotiating use of header compression inside the second tunnel.

7. The method of claim 1, further comprising handling signaling between the serving gateway node and the donor base station node for negotiating by a Mobility Management Entity (MME) use of header compression inside the first tunnel.

8. The method of claim 1, further comprising:
    determining that the second tunnel comprises a radio link; and
    in response to determining that the second tunnel comprises a radio link, activating use of e header compression over the second tunnel.

9. The method of claim 1, further comprising
    determining that the second tunnel has a transport capacity below a predetermined value; and
    in response to determining that the second tunnel has a transport capacity below the predetermined value, activating use of header compression over the second tunnel.

10. A method of operating a telecommunications network comprising a serving gateway node; a donor base station node; and a relay base station node; the method comprising:
    negotiating use of header compression over at least a portion of a backhaul link, the backhaul link extending between the serving gateway node and the relay base station node of the telecommunications network, wherein the backhaul link comprises: (i) a first tunnel having a first tunnel identifier and extending between a serving gateway node of the telecommunications network and a donor base station node and (ii) a second tunnel having a second tunnel identifier and extending between the donor base station node and a relay base station node, and wherein the second tunnel traverses a radio interface between the relay base station node and the donor base station node, wherein negotiating use of header compression comprises:
        using a signaling message from the serving gateway node to a mobility management entity for ascertaining whether the serving gateway node agrees to use header compression; and
        using a signaling message from the donor base station node to the mobility management entity for ascertaining whether the base station node agrees to use header compression;
    receiving, at the donor base station node, a packet transmitted over the first tunnel, wherein the received packet comprises an outer internet protocol (IP) header and an inner IP header;
    compressing the inner IP header of the packet; and
    switching the packet from the first tunnel to the second tunnel for transmission to the relay base station node.

11. The method of claim 10, wherein negotiating use of header compression comprises:
    (1) ascertaining whether the serving gateway node agrees to use of header compression;
    (2) ascertaining whether the donor base station node agrees to use header compression; and
    (3) using (1) and (2) to determine whether to implement header compression on the first tunnel.

12. The method of claim 10, wherein the first tunnel comprises a General Packet Radio service Tunneling Protocol (GTP) tunnel between the serving gateway node and the donor base station node, wherein header compression is applied for packets carried inside the GTP tunnel.

13. The method of claim 10, further comprising:
(a) obtaining a header compression initialization parameter from the serving gateway node;
(b) obtaining a response from the donor base station node concerning the header compression initialization parameter; and
(c) using the response of act (b) to determine whether to implement header compression on the first tunnel.

14. The method of claim 10, further comprising negotiating use of header compression on the backhaul link upon performance of any one of: a bearer establishment procedure; an attachment procedure; or a handover procedure.

15. The method of claim 10, further comprising handling signaling between the donor base station node and the relay base station node for negotiating the use of the header compression inside the second tunnel.

16. The method of claim 10, further comprising handling signaling between the serving gateway node and the donor base station node for negotiating by a Mobility Management Entity (MME) use of header compression inside the first tunnel.

17. The method of claim 10, further comprising:
determining that the second tunnel comprises a radio link; and
in response to determining that the second tunnel comprises the radio link, activating use of header compression over the second tunnel.

18. The method of claim 10, further comprising:
determining that the second tunnel has a transport capacity below a predetermined value; and
in response to determining that the second tunnel has the transport capacity below the predetermined value, activating use of header compression when over the second tunnel.

19. A telecommunications network comprising:
a serving gateway node;
a relay base station node;
a donor base station node; and
a mobility management entity configured to:
negotiate whether to use header compression on a backhaul link, wherein the backhaul link comprises: (i) a first tunnel having a first tunnel identifier and extending between the serving gateway node and the donor base station node and (ii) a second tunnel having a second tunnel identifier and extending between the donor base station node and the relay base station node, and wherein the second tunnel traverses a radio interface between the relay base station node and the donor base station node;
receive a signaling message from the serving gateway node to the mobility management entity for ascertaining whether the serving gateway node agrees to use header compression; and
receive a signaling message from the donor base station node to the mobility management entity for ascertaining whether the base station node agrees to use header compression;
wherein the donor base station node is configured to receive a packet transmitted over the first tunnel, wherein the received packet comprises an outer internet protocol (IP) header and an inner IP header;
wherein the donor base station node is configured to compress the inner IP header of the packet; and
wherein the donor base station node is configured to switch the packet from the first tunnel to the second tunnel for transmission to the relay base station node.

20. The telecommunications network of claim 19, wherein the mobility management entity is further configured to negotiate the use of the header compression inside the second tunnel.

21. The telecommunications network of claim 19, wherein the mobility management entity is further configured to negotiate the use of the header compression inside the first tunnel.

22. The telecommunications network of claim 19, wherein the mobility management entity is further configured to negotiate use of header compression with the donor base station node.

* * * * *